(12) United States Patent
Derouault et al.

(10) Patent No.: US 6,736,629 B1
(45) Date of Patent: May 18, 2004

(54) MOLDING UNIT AND EXTRUSION-BLOW MOLDING MACHINE EQUIPPED THEREWITH

(75) Inventors: Philippe Derouault, Octeville-sur-Mer (FR); Eric Lemaistre, Octeville-sur-Mer (FR)

(73) Assignee: Sidel, Le Havre (FR)

( * ) Notice: Subject to any disclaimer, the term of this patent is extended or adjusted under 35 U.S.C. 154(b) by 0 days.

(21) Appl. No.: 09/914,648

(22) PCT Filed: Feb. 24, 2000

(86) PCT No.: PCT/FR00/00466
§ 371 (c)(1),
(2), (4) Date: Jan. 17, 2002

(87) PCT Pub. No.: WO00/53394
PCT Pub. Date: Sep. 14, 2000

(30) Foreign Application Priority Data

Mar. 8, 1999 (FR) .............................. 99 02928

(51) Int. Cl.[7] ............................................. B29C 49/56
(52) U.S. Cl. ................................... 425/541; 425/451.7
(58) Field of Search .............................. 425/541, 451.7, 425/405.1, 389

(56) References Cited

U.S. PATENT DOCUMENTS 3,734,671 A * 5/1973 Talasz ....................... 425/541
3,924,987 A * 12/1975 Mehnert .................. 425/451.5
5,730,927 A * 3/1998 Rader et al. ................. 264/523

FOREIGN PATENT DOCUMENTS

| DE | DT2264887 A1 | * | 5/1975 | |
| EP | 0730941 A1 | * | 9/1996 | ........... B29C/49/56 |
| FR | 2209647 A | * | 8/1974 | ............. B29C/1/16 |
| GB | 1106602 A | * | 3/1968 | |

* cited by examiner

Primary Examiner—Robert B. Davis
(74) Attorney, Agent, or Firm—Sughrue Mion, PLLC

(57) ABSTRACT

The invention concerns a molding unit for an extrusion-blow molding machine comprising a mold in two parts, each mold-half (12, 14) being borne by a moveable support (16, 18), and of the type in which the molding unit (10) comprises, between at least one of the mold-halves (12) and the associated support (16), compensating means (30) which push the mold-half transversely toward the other mold-half, characterized in that the mechanism (24) for moving the supports is linked to at least said associated support (32), by means of elastically deformable means that are suitable for compensating for the deformation of the support (15[sic], 32), created by the forces exerted by the compensating means (30).

21 Claims, 3 Drawing Sheets

MOLDING UNIT AND EXTRUSION-BLOW MOLDING MACHINE EQUIPPED THEREWITH

The present invention relates to the field of extrusion-blow molding machines for articles made of thermoplastic material, particularly for the production of containers such as bottles, flasks or water bottles.

Such a machine essentially comprises an extrusion head that produces at least one tubular plastic parison, at least one molding unit comprising a mold in two parts, the two parts of the mold being positioned so as to close over the parison that is still soft from the extrusion head, and a blow-forming station that is provided with means for injecting air under pressure inside the parison enclosed in the mold. The air under pressure allows the parison to be deformed so that it fits the form of the mold cavity.

The machine can also comprise a degating station that allows the excess material to be cut off.

More particularly, the invention relates to a molding unit for such a machine. This molding unit comprises a mold in two parts in which each mold-half is borne by a movable support. The two movable supports are moved transversely in opposite directions with respect to a frame that holds them. In an open position, the two mold-halves are transversely separated from each other to allow a blank of the article, that is, a parison, to be inserted in a cavity delimited between the two mold-halves. In a closed position, the two mold-halves are pressed against each other by their front faces, and the supports are connected to each other by locking means.

The two supports can be movable in transverse displacement, but they can also be moved in rotation, for example around a common axis parallel to the plane of the joint of the two mold-halves.

Of course, the molding unit has a mechanism for simultaneously moving both mold supports. This mechanism is adapted to the relative path of the two supports.

In extrusion-blow molding machines, it is often provided that the molding unit comprises, between at least one of the mold-halves and the associated support, fluid pressure compensating means that push this mold-half transversely toward the other mold-half. These compensating means make it possible to prevent the two mold-halves from separating from each other under the effect of the blow pressure. They also enable the front faces of the two mold-halves to be securely closed against each other, in spite of the presence of the excess material caught between the two mold-halves at the time of closure.

An extrusion blow-molding machine incorporating these characteristics is described, for example, in the document U.S. Pat. No. 5,730,927.

The compensating means that make it possible to securely and effectively close the two mold-halves against each other exert large forces on the support that bears them. These forces increase with the size of the article to blow-mold, or in the case of a mold with multiple cavities, with the number of cavities of the mold. In effect, the forces exerted by the compensating means on the support are proportional to the blow-molding pressure, as well as to the blown surface area, in the transverse direction, of the cavity or cavities of the mold. They also depend on the amount of material caught between the two molds.

Of course, locking means are provided to resist these forces that tend to separate the two supports from each other.

However, the locking means can not prevent the support that bears the compensating means from tending to become deformed under the action of these forces.

Such being the case, this deformation, even if not very large, is then transferred to the mechanism that controls the movements of the supports. This mechanism must therefore be able to absorb without damage the forces resulting from such deformation, which generally leads to making the mechanism larger than what would be exactly needed to provide the opening-closing function of the mold.

Another solution consists of making the mold supports particularly rigid. In this case, however, the supports are then heavy and bulky, which, in addition to a higher production cost for these supports, also requires that a stronger control mechanism be provided to cause their movements. The weight of the mold supports is particularly detrimental in the case of high speed machines, in which there is a need to reduce the opening and closing time of the molds as much as possible, and thus to increase the speed of these movements, in spite of the Inertia caused by the weight of the supports.

A purpose of the invention, therefore, is to propose a new design of the molding unit that allows lighter mold supports to be used, without, however, requiring oversized means to control their movements.

To that end, the invention proposes a molding unit of the type described above, characterized in that the mechanism for moving the supports is linked at least with said associated support by elastically deformable means capable of compensating the deformation of the support produced by the forces exerted by the compensating means.

According to other characteristics of the invention:

- the plate can pivot with respect to the support;
- the movement mechanism acts on a plate that is slideably mounted on the support, and spring forming means are interposed transversally between the plate and the support;
- the spring forming means comprise blocks of elastomer material;
- the mechanism for moving the two supports comprises a drive screw that is provided with two threaded sections, the direction of turn of the threads of the two sections being opposite and each threaded section cooperating with a nut linked to one of the supports, and elastically deformable means are interposed between the nut and the support to which it is linked;
- the nuts are ball-race nuts; and
- the molding unit comprises compensating means only between one of the mold-halves and the associated support, and the elastically deformable means are interposed only between said associated support and the movement mechanism of the supports.

The invention also proposes an extrusion-blow molding machine, characterized in that it comprises at least one molding unit incorporating any one of the preceding characteristics.

Other characteristics and advantages of the invention will appear from the following detailed description, as well as from the appended drawings in which.

Figure 1:
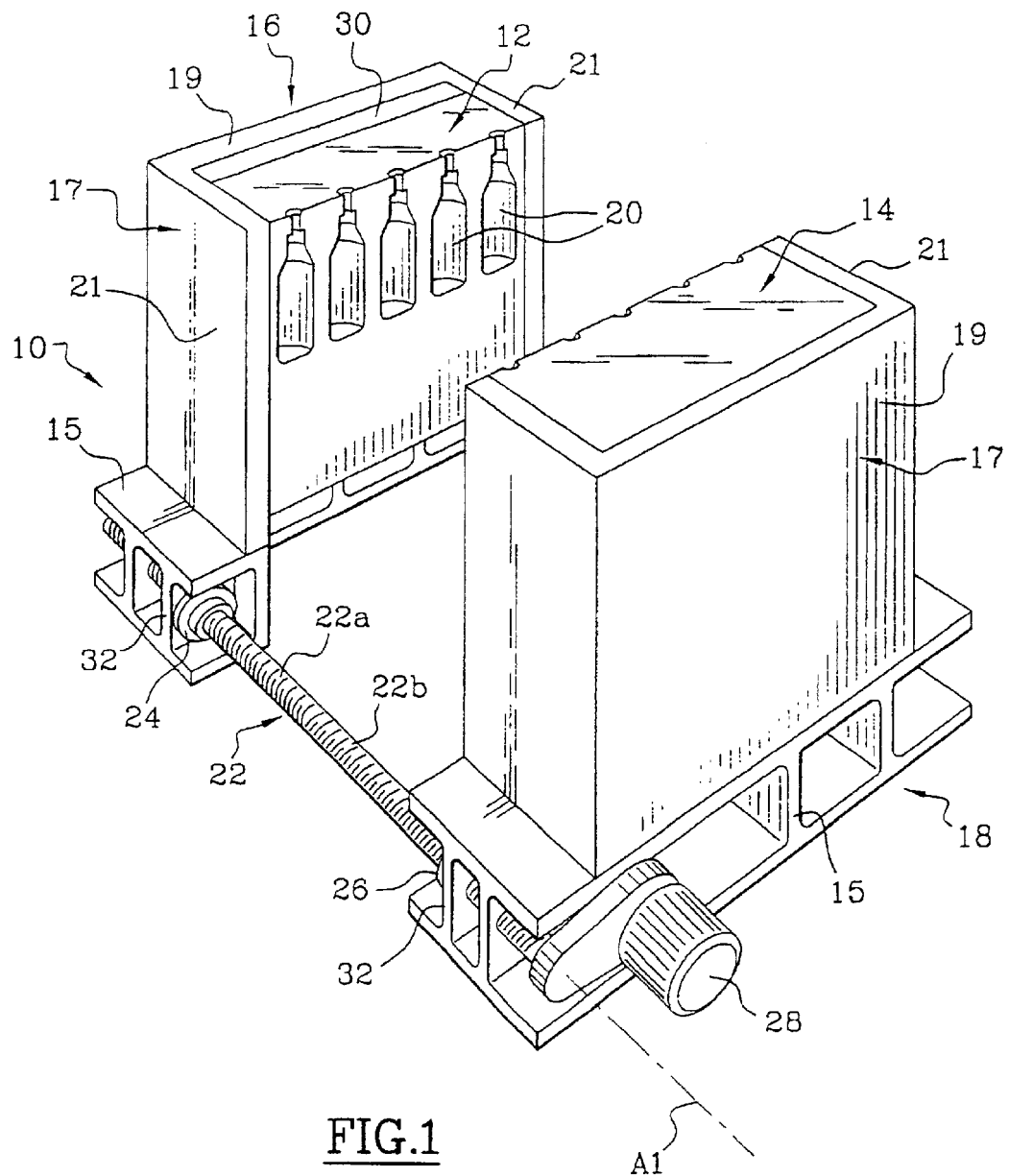
FIG. 1 is a diagrammatic view in perspective illustrating a molding unit according to the method of the invention, in which the control mechanism of the supports is made in the form of a screw mechanism and ball-race nuts.

FIG. 1 diagrammatically illustrates a molding unit 10 for an extrusion-blow molding machine. The unit 10 essentially comprises two mold-halves 12, 14 each of which is born by a support 16, 18. The two supports are movable along a transversal axis perpendicular to the plane of the joint of the two mold-halves 12, 14, between a closed position and an open position illustrated in FIG. 1. The two supports 16, 18 each comprise a base 15 on which is mounted a mold clamping unit 17 which presents a rear plate 19 and two side flanges 21. The two front parts facing the two mold-halves have cavity-halves 20 which, when the mold is closed, define a cavity in the shape of the article to be formed.

In this particular case, the supports 16, 18 are transversally movable because their respective bases 15 are slideably mounted on transverse rails (not represented).

In order to control the relative movements of the two supports 16, 18, the unit 10 comprises a screw/nut type mechanism comprising a screw 22 with transverse axis A1 and two ball-race nuts 24 one of which is integral with a first support 16 and the other 26 with the second support 18. The screw 22 is transversely fixed with respect to a frame that holds the molding unit 10, and it comprises two threaded sections 22a and 22b which present thread pitches for which the directions of turn are opposite to each other. The nut 24 of the first support cooperates with the first 22a of the sections while the nut 26 of the second support 1B cooperates with the other section 22b. In this way, when the screw 26 is driven in rotation around its axis A1 by a motor 28, the two supports 16, 18 are simultaneously controlled in transverse displacement in opposite directions. If the value of the pitch of the two threaded sections is the same, the two supports are moved over an equal distance.

This mechanism is particularly advantageous because it has a small number of parts, while still ensuring great precision and perfect reproducibility of the simultaneous movements of the two supports. Moreover, the use of ball-race nuts makes it possible on the one hand to obtain good energy efficiency, and on the other hand to obtain movements with high speeds and strong accelerations.

The molding unit 10 is therefore intended to be placed in mold-open position beneath an extrusion unit having as many extrusion dies as the mold has cavities. When the parison extruded by each head has reached the desired length, the mold is shut to enclose, in each cavity, a parison section. The mold is then closed by the screw/nuts mechanism, and the two supports are secured to each other by locking means (not represented), placed for example at the front edges of the flanges 21. Next, the molding unit is intended to cooperate with a blow-molding station to inject a fluid under pressure into the parisons enclosed in each cavity, in order to mold the parison to the shape of the cavity.

To compensate for the tendency of the mold-halves to separate under the action of the blow-molding fluid, the blow-molding unit, according to the invention, comprises fluid pressure compensating means that are interposed transversally between the support and the associated mold-half to push the mold-half in question back in the direction of the other mold-half.

In the proposed exemplary embodiment, compensating means are provided only between the first support 16 and the associated mold-half 12. The second mold-half 14 is rigidly fixed to the second support 18.

The compensating means are formed here by a flexible cushion 30 placed between the rear plate 19 of the support 16 and a rear face of the mold-half 12. It will be noted that the cushion has a surface area that is substantially equal to, or even greater than, that of the mold-half. In this way, by inflating the cushion 30 with a fluid at a pressure substantially equal to that of the blow-molding fluid, the resulting action of the two fluids on the mold-half is an action that pushes toward the other mold-half 14.

In the extrusion-blow molding process, pressures on the order of 10 bars are generally used. Also, when the mold has a large cavity or several cavities, the forces exerted by the fluid pressures can be quite large. Such being the case, the compensating cushion 30 is essentially supported against the rear plate 19 of the mold damping unit 17.

According to the invention, mold supports are provided that are light enough to allow high movement speeds without having to use very powerful motors. Also, under the effect of the compensating cushion 30, it can be seen that the support can be significantly deformed, while still remaining within the scope of elastic deformation. Such deformation, therefore, can produce stresses where the support 16 is connected to the mechanism that controls its movements.

Also, according to the invention, it is provided that elastically deformable means be interposed between the first support 16 and the corresponding nut 24.

In the exemplary embodiment illustrated in FIG. 1, the screw 22 is placed on one of the sides of the molding unit and not in the transverse plane of symmetry thereof. The nuts 24, 26 are attached to the plate elements 32 of the bases 15 of each of the supports, the screw 22 passing through said plate elements 32, which are perpendicular to the axis A1.

Figure 2:
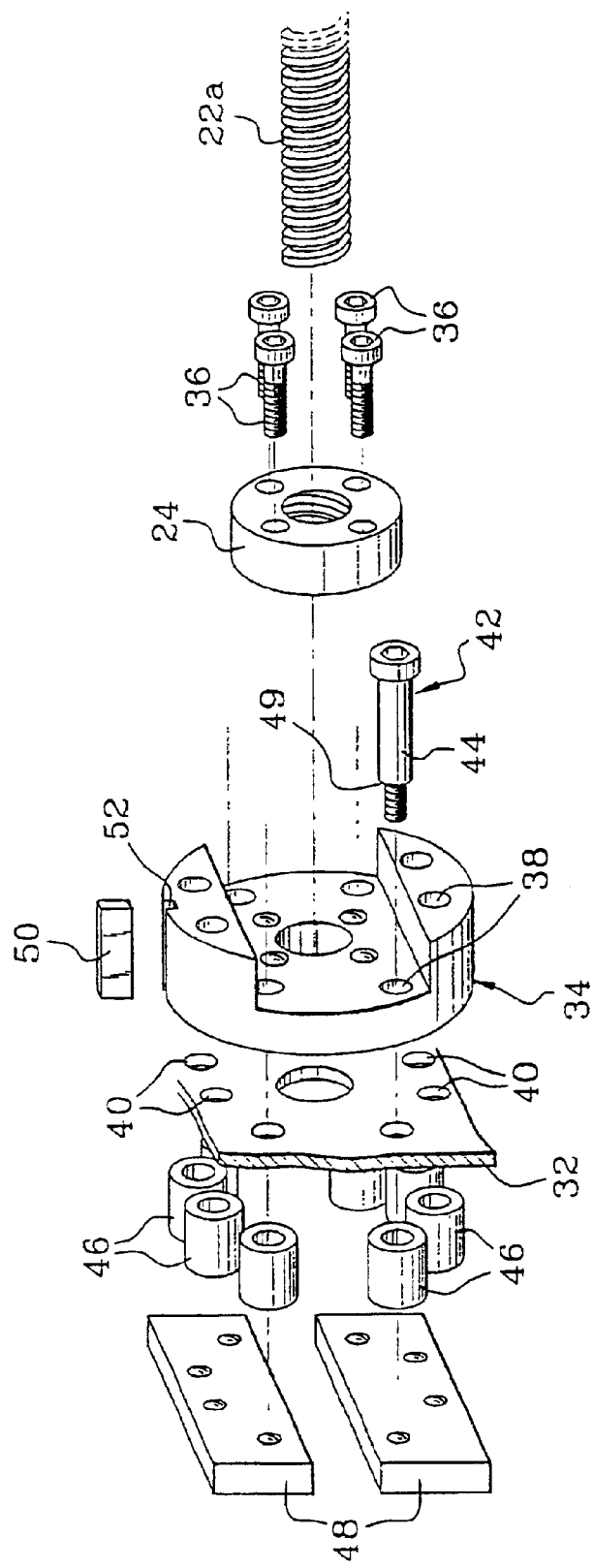
FIG. 2 is a more detailed exploded view in perspective illustrating the deformable means interposed between the screw/nut mechanism and one of the supports.
Figure 3:
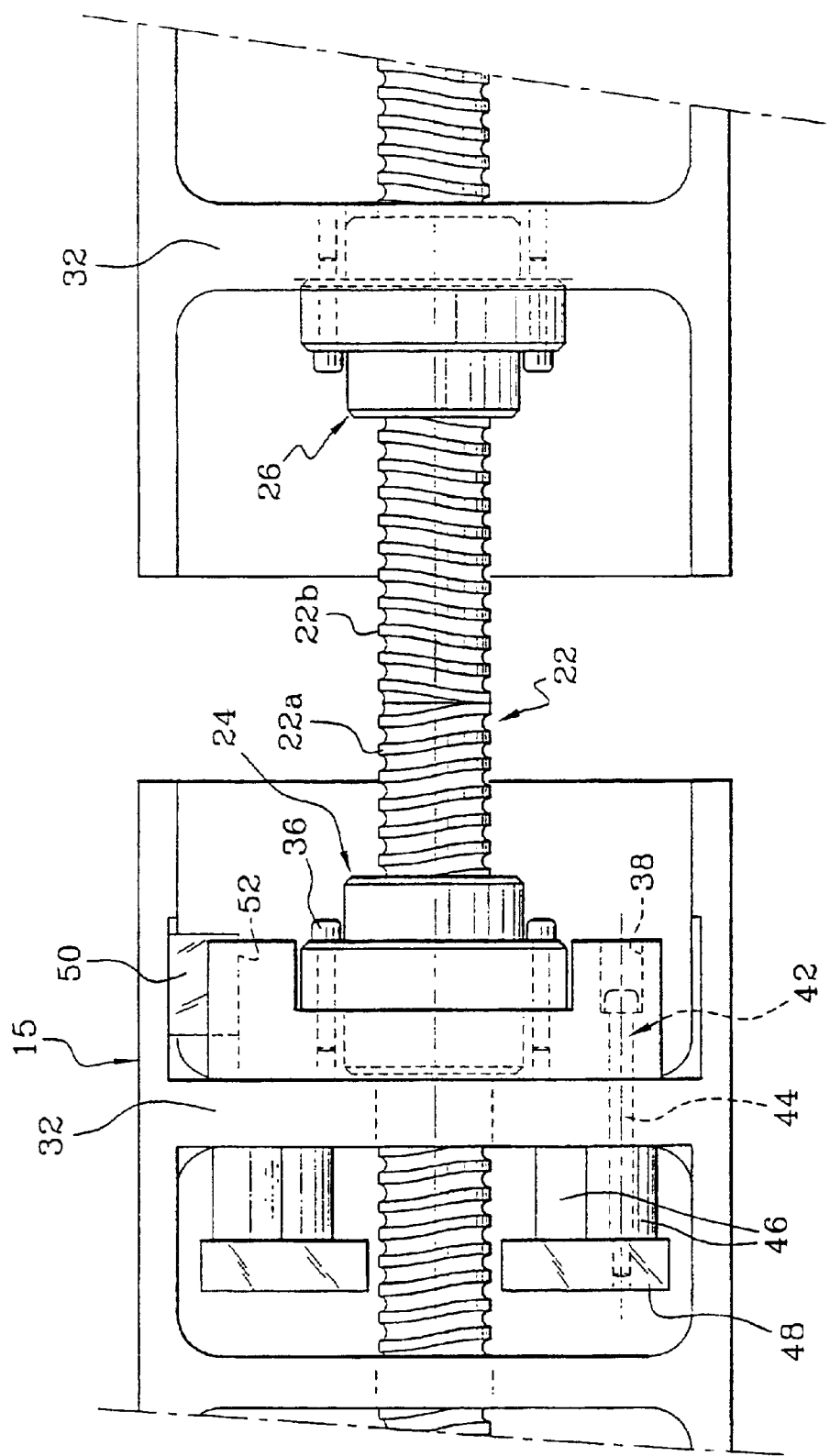
FIG. 3 is a cross sectional view illustrating more precisely the assembly of the deformable means.

The deformable means according to the invention are more precisely illustrated in FIGS. 2 and 3.

Thus, the nut 24 is attached, by four screws 36, to a plate 34 that is transversely slideably mounted on the plate element 32 of the base 15. To accomplish this, the plate 34 has eight orifices 38 that correspond to eight orifices 40 made in the plate element 32, in front of which the plate 34 is placed. Through each of these orifices 38, 40, a screw 42 is engaged, the head of which is supported against the plate 34 and the shank of which is only threaded at the end, so that it has a smooth section 44 under the head.

The shank of each screw 42 is thus engaged transversely toward the rear successively through the plate 34, the plate element 32 and a tubular stud 46 made of an elastomer material. Finally, the free end of each screw 42 is screwed into the distribution plate 48 in such a way as to, on the one hand, force the plate 34 against the front face of the plate element 32, and on the other hand, to transversely tighten the tubular stud 46 against the rear face of the plate element 32.

In the proposed example, the eight screws 42 are regularly distributed angularly around the axis A1 and two distribution plates 48 are provided, each plate receiving the threaded end of four screws 42.

The smooth shank 44 of the screw 42 has a length that is less than the length of the transverse assembly of the plate 34, the plate element 32 and the undeformed tubular stud 46, in order to be able to prestress said stud. Moreover, the smooth shank has a smaller diameter than the orifices 40 of the plate element 32, in order to allow each screw 42 to slide freely with respect to the support 16.

Preferably, the threaded portion of the screw 42 is of a smaller diameter than the smooth section 42, so that they are separated by a shoulder 49. Thus, the screw can be tightened until the distribution plate 48 is against the shoulder 49, determining a precise tightening value for the elastomer stud 46.

Thus assembled, the plate 34 is therefore flexibly linked to the support 16, which allows the plate element 32 of the support 16 to move with respect to the screw 22 without carrying along with it the nut 24 when the support 16 is deformed. The force exerted by the nut 24 on the screw 22 is thus limited to the value of the compression force of the studs 46.

The movement of the plate 34 with respect to the plate element 32 is essentially a transverse sliding movement, but because of the limited support length of the screws 42 in the orifices 40, the plate 34 can also pivot slightly with respect to the support 16 around two axes perpendicular to the axis A1 and perpendicular to each other.

Specific means are preferably provided that make it possible to prevent any rotation of the plate 34 around the axis A1. This function should not be carried out by the screws 42, because friction might be produced that could hinder the relative sliding of the plate 34 and the support 16. Also, a groove 52 radially open to the outside with respect to the axis A1, is provided in the plate 34. A key 50, integral with the base of the support 16, is received in the groove 52 to ensure precise angular indexing of the plate 34 around the axis Al, without inducing a shearing force on the screws 42.

Of course, the invention is not limited to the single embodiment described in detail above. Indeed, the invention could be implemented when the mechanism for moving the supports is of another type, for example a cam mechanism. Also, the invention is applicable when the supports are actuated by a relative movement other than transverse displacement. e.g., a rotational movement as in the case of a "portfolio" mold. In the same way, a person skilled in the art could easily determine equivalent embodiments for forming the elastically deformable means that are interposed between the mechanism and the support.

What is claimed is:

1. A molding unit for an extrusion-blow molding machine for articles made of thermoplastic material, of the type in which the molding unit (10) comprises a mold in two parts (12, 14), each mold-half (12, 14) being borne by a movable support (16, 18), of the type in which the two movable supports (16, 18) are moved transversely, in opposite directions with respect to the frame that bears them, between an open position in which the two mold-halves (12, 14) are transversely separated from each other, to allow the insertion of a blank of the article in a cavity delimited between the two mold-halves, and a closed position in which the two mold-halves are pressed against each other and in which the supports (16, 18) are connected to each other by a screw means, of the type in which the molding unit (10) has a mechanism (22, 24, 26) of simultaneous movement of the two supports of the molds (16,18), and of the type in which the molding unit (10) has, between at least one of the mold-halves (12) and the associated support (16), compensating means (30) which push the mold-half (12) transversely toward the other mold-half (14), characterized in that the mechanism (24) for moving the supports is linked to at least said associated support (16), by means of elastically deformable means (46) that are suitable for compensating for the deformation of the support (16) created by the forces exerted by the compensating means (30).

2. The molding unit according to claim 1, characterized in that the mechanism for moving the supports acts on the plate (34), which is transversely slideably mounted on the support (32, 16), and in that the elastically deformable means (46) are interposed transversally between the plate (34) and the support (32, 16).

3. The molding unit according to claim 2, characterized in that the plate (34) can pivot with respect to the support (16).

4. The molding unit according to claim 3, characterized in that the elastically deformable means comprise blocks of elastomer material (46).

5. The molding unit according claim 4, characterized in that the mechanism for moving the supports (16, 18) is comprised of a drive screw (22), which is furnished with two threaded sections (22a, 22b), the direction of turn of the threads of the two sections being opposite, and each threaded section cooperating with a nut (24, 26) linked to one of the supports, and in that the elastically deformable means (46) are interposed between the nut (24) and the support (16) to which it is linked.

6. The molding unit according to claim 5, characterized in that the nuts (24, 26) are ball-race nuts.

7. The molding unit according to claim 1, characterized in that it comprises compensating means (30) only between one (12) of the mold-halves and the associated support (16), and in that the elastically deformable means (46) are interposed only between said associated support and the mechanism for moving the supports (16, 18).

8. An extrusion-blow molding machine, characterized in that it comprises at least one molding unit according to claim 1.

9. The molding unit according to claim 1, characterized in that:

the movement mechanism acts on the plate (34), which is transversely slideably mounted on the support (32, 16), and in that the elastically deformable means (46) are interposed transversally between the plate (34) and the support (32, 16); and the elastically deformable means comprise blocks of elastomer material (46).

10. The molding unit according to claim 1, characterized in that:

the mechanism for moving the supports acts on the plate (34), which is transversely slideably mounted on the support (32, 16), and in that the elastically deformable means (46) are interposed transversally between the plate (34) and the support (32, 16); and the mechanism for moving the supports (16, 18) is comprised of a drive screw (22), which is furnished with two threaded sections (22a, 22b), the direction of turn of the threads of the two sections being opposite, and each threaded section cooperating with a nut (24, 26) linked to one of the supports, and in that the elastically deformable means (46) are interposed between the nut (24) and the support (16) to which it is linked.

11. The molding unit according to claim 1, characterized in that:

the mechanism for moving the supports acts on the plate (34), which is transversely slideably mounted on the support (32, 16), and in that the elastically deformable means (46) are interposed transversally between the plate (34) and the support (32, 16);

the elastically deformable means comprise blocks of elastomer material (46); and the mechanism for moving two supports (16, 18) is comprised of a drive screw (22), which is furnished with two threaded sections (22a, 22b), the direction of turn of the threads of the two sections being opposite, and each threaded section cooperating with a nut (24, 26) linked to one of the supports, and in that the elastically deformable means (46) are interposed between the nut (24) and the support (16) to which it is linked.

12. The molding unit according to claim 1, characterized in that:

the mechanism for moving the supports acts on the plate (34), which is transversely slideably mounted on the support (32, 16), and in that the elastically deformable means (46) are interposed transversally between the plate (34) and the support (32, 16);

the plate (34) can pivot with respect to the support (16); and the mechanism for moving two supports (16, 18) is comprised of a drive screw (22), which is furnished with two threaded sections (22a, 22b), the direction of turn of the threads of the two sections being opposite, and each threaded section cooperating with a nut (24, 26) linked to one of the supports, and in that the elastically deformable means (46) are interposed between the nut (24) and the support (16) to which it is linked.

13. The molding unit according to claim 1, characterized in that the plate (34) can pivot with respect to the support (16).

14. The molding unit according to claim 1, characterized in that:

the plate (34) can pivot with respect to the support (16); and the elastically deformable means comprise blocks of elastomer material (46).

15. The molding unit according to claim 1, characterized in that:

the plate (34) can pivot with respect to the support (16); and the mechanism for moving the supports (16, 18) is comprised of a drive screw (22), which is furnished with two threaded sections (22a, 22b), the direction of turn of the threads of the two sections being opposite, and each threaded section cooperating with a nut (24, 26) linked to one of the supports, and in that the elastically deformable means (46) are interposed between the nut (24) and the support (16) to which it is linked.

16. The molding unit according to claim 1, characterized in that the mechanism for moving the supports (16, 18) is comprised of a drive screw (22), which is furnished with two threaded sections (22a, 22b), the direction of turn of the threads of the two sections being opposite, and each threaded section cooperating with a nut (24, 26) linked to one of the supports, and in that the elastically deformable means (46) are interposed between the nut (24) and the support (16) to which it is linked.

17. The molding unit according to claim 10, characterized in that the nuts (24, 26) are ball-race nuts.

18. The molding unit according to claim 11, characterized in that the nuts (24, 26) are ball-race nuts.

19. The molding unit according to claim 12, characterized in that the nuts (24, 26) are ball-race nuts.

20. The molding unit according to claim 15, characterized in that the nuts (24, 26) are ball-race nuts.

21. The molding unit according to claim 16, characterized in that the nuts (24, 26) are ball-race nuts.

* * * * *